United States Patent
Zhu et al.

(10) Patent No.: US 11,119,704 B2
(45) Date of Patent: Sep. 14, 2021

(54) SYSTEM, APPARATUS AND METHOD FOR SHARING A FLASH DEVICE AMONG MULTIPLE MASTERS OF A COMPUTING PLATFORM

(71) Applicant: Intel Corporation, Santa Clara, CA (US)

(72) Inventors: Zhenyu Zhu, Folsom, CA (US); Mikal Hunsaker, El Dorado Hills, CA (US); Karthi R. Vadivelu, Folsom, CA (US); Rahul Bhatt, El Dorado Hills, CA (US); Kenneth P. Foust, Beaverton, OR (US); Rajesh Bhaskar, Bangalore (IN); Amit Kumar Srivastava, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 84 days.

(21) Appl. No.: 16/367,608

(22) Filed: Mar. 28, 2019

(65) Prior Publication Data

US 2019/0227753 A1 Jul. 25, 2019

(51) Int. Cl.
*G06F 3/06* (2006.01)
*G06F 13/38* (2006.01)
*G06F 9/54* (2006.01)

(52) U.S. Cl.
CPC .......... *G06F 3/0679* (2013.01); *G06F 3/0604* (2013.01); *G06F 3/0658* (2013.01); *G06F 3/0659* (2013.01); *G06F 9/544* (2013.01); *G06F 13/385* (2013.01); *G06F 2213/0042* (2013.01)

(58) Field of Classification Search
CPC .... G06F 3/0604; G06F 3/0658; G06F 3/0659; G06F 3/0679; G06F 9/544; G06F 13/385; G06F 2213/0042
USPC ........................... 710/74, 104, 110; 711/103
See application file for complete search history.

(56) References Cited

U.S. PATENT DOCUMENTS

| | | | |
|---|---|---|---|
| 2006/0155904 A1 | 7/2006 | Murakami et al. | |
| 2008/0147907 A1* | 6/2008 | Triece ................... | G06F 13/285 710/22 |
| 2009/0013115 A1* | 1/2009 | Ishino .................. | G06F 13/1663 710/118 |
| 2013/0151829 A1 | 6/2013 | Amann et al. | |
| 2018/0357192 A1* | 12/2018 | Chun .................... | G06F 13/404 |
| 2019/0042514 A1 | 2/2019 | Enamandram et al. | |

OTHER PUBLICATIONS

European Patent Office, Communication and European Search Report dated Jun. 17, 2020 in European patent application No. 20 15 7955.4, 11 pages total.

(Continued)

*Primary Examiner* — Gary J Portka
(74) *Attorney, Agent, or Firm* — Trop, Pruner & Hu, P.C.

(57) ABSTRACT

In one embodiment, a flash sharing controller is to enable a plurality of components of a platform to share a flash memory. The flash sharing controller may include: a flash sharing class layer including a configuration controller to configure the plurality of components to be flash master devices and configure a flash sharing slave device for the flash memory; and a physical layer coupled to the flash sharing class layer to communicate with the plurality of components via a bus. Other embodiments are described and claimed.

19 Claims, 7 Drawing Sheets

(56) References Cited

OTHER PUBLICATIONS

Intel Corporation, "Serial Flash Hardening Product, External Architecture Specification (EAS), Rev 0.7," Mar. 2013, 24 pages.
U.S. Appl. No. 16/258,828, filed Jan. 28, 2019, entitled "System, Apparatus and Method for Replay Protection for a Platform Component," by Zhenyu Zhu, et al.

\* cited by examiner

SYSTEM, APPARATUS AND METHOD FOR SHARING A FLASH DEVICE AMONG MULTIPLE MASTERS OF A COMPUTING PLATFORM

TECHNICAL FIELD

Embodiments relate to interconnection of a flash memory for access by multiple masters.

BACKGROUND

Many computer, mobile, and server platforms support advanced platform features like universal serial bus (USB) Type-C and display ports, which require external components including bus retimers and port controllers. Each component uses flash memory storage for their firmware, parameters and configurations, etc. For example on a typical computer platform, there could be more than six USB Type-C ports each requiring a retimer and a port controller, resulting in a total of more than 12 flash devices to support these components. This adds a lot of bill of materials (BOM) cost and board area to such systems.

DETAILED DESCRIPTION

In various embodiments, a computing platform may be configured to enable sharing of non-volatile memory (e.g., flash memory). More specifically, embodiments enable a computing platform to share one or more flash memories via a serial bus. As examples, the serial bus may be an enhanced serial peripheral interface (eSPI)/I²C/I3C, or another serial bus. In this way, flash accesses to multiple platform components can occur using a low pin count serial interface, which can support multi-master capabilities. In contrast, with conventional configurations that use a dedicated flash memory for each external component on a platform, cost and complexity increase.

In this way, low cost platform storage solutions are realized by sharing flash devices among multiple platform components. With embodiments, significant BOM costs and board area optimizations are possible. Embodiments provide a low cost platform storage solution by sharing flash devices among multiple platform components, which can save significant BOM cost and board areas. Flash sharing over a serial bus scheme supports flash accesses to all platform components using a low pin count serial interface, which can support multi-master capability.

In embodiments, a flash memory sharing protocol layer is provided above a low pin count input/output (IO) interface that supports multi-master capabilities in order to support a shared flash service/storage to platform components. A set of flash access commands and protocol formats are defined to support external flash accesses from multiple masters. An arbitration protocol scheme may be used to support concurrency and fairness among all flash masters and avoid starvation. An access control mechanism also may be included to improve the security of this flash sharing mechanism to enhance platform security.

Figure 1:
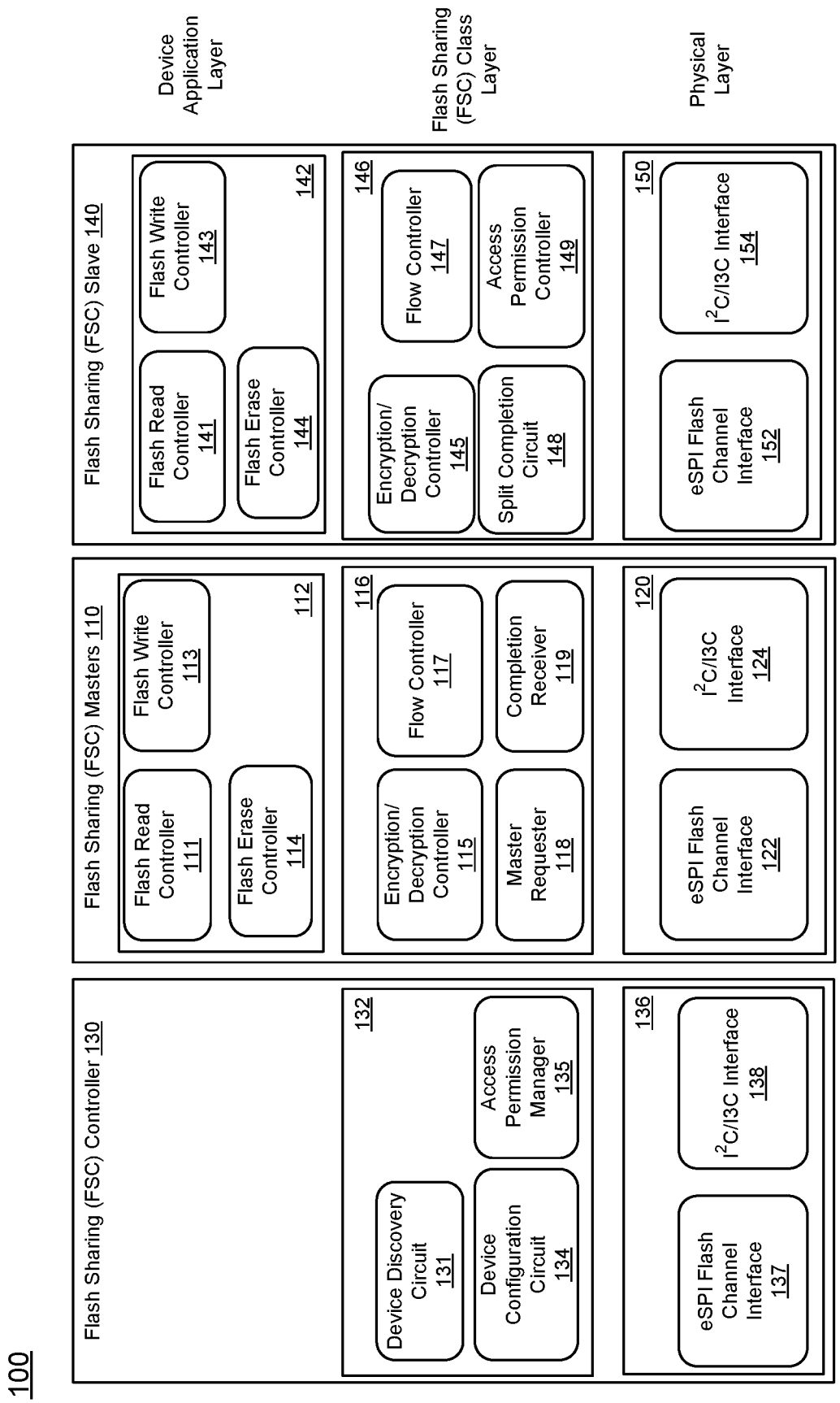
FIG. 1 is a block diagram of a system environment in accordance with an embodiment of the present invention.

Referring now to FIG. 1, shown is a block diagram of a system environment in accordance with an embodiment of the present invention. As shown in FIG. 1, system environment 100 includes multiple devices that may couple together. Environment 100 may be any type of computing platform, ranging from a small portable device such as a smart phone, tablet computer or so forth, to larger systems including desktop computers, server computers, and so forth. In the illustration of FIG. 1, a portion of environment 100 is illustrated in which multiple devices that perform flash sharing as described herein are present.

Specifically, FIG. 1 illustrates representative flash sharing masters 110, a flash sharing controller 130, and a flash sharing slave 140. As will be described further herein, flash sharing controller 130 is configured to enable a given flash sharing master 110 (which is a representative one of multiple such flash sharing masters) to share access to flash sharing slave 140 (which in some cases may be one of multiple such flash sharing slaves). Note that devices 110, 130, 140 may couple together by one or more of any type of communication bus such as an I3C bus, USB, eSPI bus, or so forth.

In an embodiment a given computing platform may have only one flash sharing controller 130, which discovers and manages multiple connected flash sharing master devices 110 (e.g., retimers) and flash slave device 140 that is an interface and controls access to one or more flash arrays or other non-volatile storage media. However, it is possible for flash sharing controller 130 and slave device 140 to be located in one physical device. In an embodiment there may be only one slave device to be shared on a platform for BOM saving. However the number of flash sharing slave devices is not limited, and therefore additional flash arrays may provide more configuration flexibility. And there can be multiple master devices 110 to share flash slave device 140.

With reference to flash sharing master 110, included is a device application layer 112, a flash sharing class (FSC) layer 116, and a physical layer 120. By inclusion of flash sharing class layer 116, flash sharing master 110 may interact with flash sharing slave 140, via configuration by flash sharing controller 130.

As illustrated in FIG. 1, device application layer 112 includes various controllers, including a flash read controller 111, a flash write controller 113 and a flash erase controller 114. In various embodiments, controllers 111, 113, 114 may be implemented as hardware circuitry, firmware, software and/or combinations thereof. Via these controllers, flash sharing master 110 may issue flash-based commands, including flash read commands, flash write commands and flash erase commands.

Flash sharing class layer 116 includes various components to enable such flash commands to be handled, both within flash sharing master 110 and, via configuration by flash sharing controller 130, directly with flash sharing slave 140. To this end, FSC layer 116 includes an encryption/decryption controller 115, a flow controller 117, a master requester 118 and a completion receiver 119. In embodiments, controller 115 enables the encryption/decryption of data to be communicated. Flow controller 117 may be configured to sequence commands received from device application layer 112 and handle communication of completions back to device application layer 112. In turn, requests for flash access may be issued via master requester 118 and similarly, received completions may be handled using completion receiver 119.

With further reference to flash sharing master 110, a physical layer 120 includes an eSPI flash channel interface 122 and an $I^2C/I3C$ interface 124. With these interfaces, depending on a particular platform implementation, communications received from flash sharing class layer 116 may be communicated via physical layer 120 to flash sharing controller 130 and/or flash sharing slave 140.

Flash sharing slave 140 similarly includes a device application layer 142 with a flash read controller 141, a flash write controller 143 and a flash erase controller 144, which may be used to handle flash-based commands, including flash read commands, flash write commands and flash erase commands. Flash sharing slave 140 further includes a flash sharing class layer 146 having various components to enable such flash commands to be handled. To this end, FSC layer 146 includes an encryption/decryption controller 145, a flow controller 147, a split completion circuit 148 to handle split completions, and an access permission controller 149 to handle access permissions, e.g., according to a mapping table. Flash sharing slave 140 further includes a physical layer 150 having an eSPI flash channel interface 152 and an $I^2C/I3C$ interface 154. With these interfaces, depending on a particular platform implementation, communications may occur between flash sharing slave 140 and flash sharing masters 110 and flash sharing controller 130.

Still with reference to FIG. 1, flash sharing controller 130 includes a FSC sharing layer 132 and a physical layer 136. In FSC layer 132, various components are present to enable flash sharing controller 130 to discover, configure and manage flash sharing slaves and masters. More specifically as shown in FIG. 1, FSC sharing layer 132 includes a device discovery circuit 131 to discover devices coupled to a serial bus. In turn, device configuration circuit 134 may configure such devices for master/slave roles, including providing configuration parameters for the devices. Finally, an access permission manager 135 may be used to manage access permissions for the different masters (e.g., types of permitted accesses, regions of access and so forth). Understand while shown at this high level in the embodiment of FIG. 1, many variations and alternatives are possible.

Figure 2:
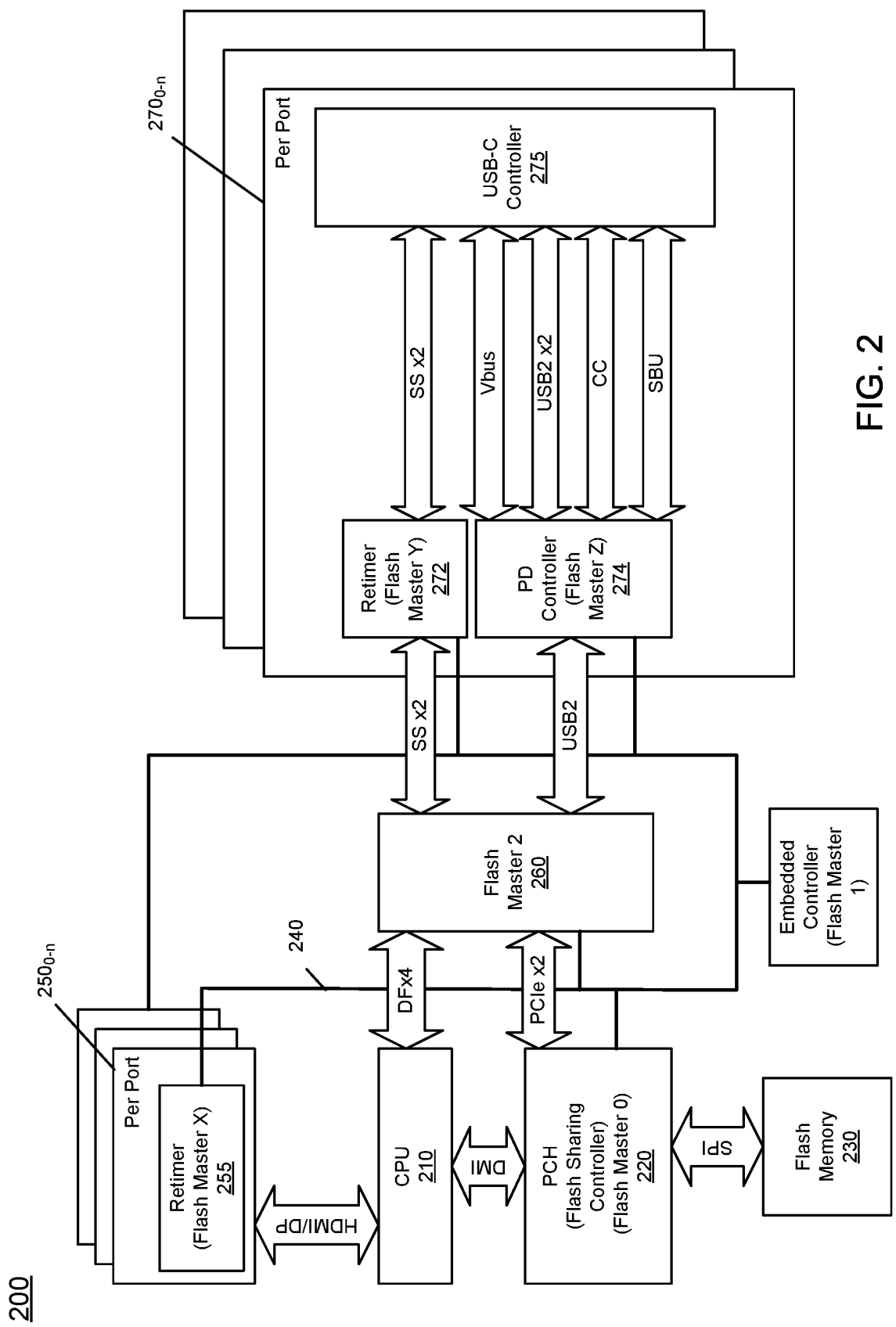
FIG. 2 is a block diagram of a system in accordance with an embodiment of the present invention.

Referring now to FIG. 2, shown is a block diagram of a system in accordance with an embodiment of the present invention. As shown in FIG. 2, system 200 may be any type of computing platform. In relevant part, devices that couple together to perform flash sharing as described herein are illustrated. As seen, a central processing unit (CPU) 210 couples to a peripheral controller hub (PCH) 220, e.g., via a direct media interface (DMI) interconnect. In different embodiments, CPU 210 and PCH 220 may be separate components. In other cases, these devices may be implemented within a single integrated circuit, such as a system on chip, and may potentially be implemented on a single die of such integrated circuit. In any event, in the embodiment shown in FIG. 2, PCH 220 includes a flash sharing controller. In some cases, PCH 220 further may include at least one flash master (flash master 0) as well. PCH 220 couples to a flash memory 230 via a given interconnect, which in the embodiment shown in FIG. 2 is a SPI interconnect. Understand that PCH 220 further may include a flash sharing controller slave device, such as FSC slave 140 of FIG. 1 to control accesses the storage media of flash memory 230.

To enable reduced component counts by way of avoiding the need for separate flash devices for various system components, the flash sharing controller within PCH 220 allows storage within flash memory 230 to be shared by multiple components. In an example, there can be more than 10 flash master devices, including USB Type-C, Thunderbolt or Display Port retimers, embedded controllers (ECs) and power delivery (PD) controllers on platform 200, which all share flash memory 230.

In the embodiment shown in FIG. 2, a variety of components or devices, including devices $250_0$-$250_n$ may be present and coupled to CPU 210 via a HDMI or Display Port interconnect. In embodiments, devices 250 may be per port devices including retimers 255 that act as flash master devices 255, such that each device $250_{0-n}$ is a given port retimer and may act as a flash master.

Another flash master device 260 may couple to CPU 210 and PCH 220 (e.g., via DF and PCIe interconnects) and may further act as an interface for a plurality of devices $270_0$-$270_n$ that may include additional flash masters, including retimers 272 (that act as flash masters y), and PD controllers 274 (that act as flash masters Z). Of course other components may be present within devices 270. As further illustrated, devices 270 also may include USB-C controllers 275 that couple to retimers 272 and PD controllers 274 via various interconnects of the USB Type-C protocol.

With an arrangement as in FIG. 2, the flash sharing controller in PCH 220 may read capability information of the various components coupled to a flash sharing bus 240. In this way, the flash sharing controller may discover all such flash master/slave devices. After the device discovery, the flash sharing controller may perform a configuration process for the various flash sharing devices. Such configuring may include assigning flash device addresses within corresponding flash slave devices for the various flash master devices. Additional configuration information may be provided for each flash master/slave, including maximum packet size (MPS), erase size, wait states and so forth. When a given flash slave device is ready, the flash sharing controller may enable the flash service for each flash master.

In various embodiments, the flash sharing controller manages the flash master/slave devices on the physical bus; discovers the capabilities of all the flash sharing devices on the bus; reads capability registers of flash master/slave devices; configures each master/slave device, including MPS/erase size/wait state, slave device address, and starts flash sharing service when the flash slave is ready. Normally the flash slave device is available when any flash master requires flash services. The flash sharing controller also assigns access control permissions based on platform security requirements, assigns regions to each flash master, and assigns access permissions to each region.

In turn, flash master devices may include flash capability registers, to indicate their ability to communicate and issue commands to a flash device. The flash master devices may further include various configuration registers, including read, write (RW) registers. In addition, the flash master devices may implement flash service enable and ready indicators, among other such configuration information. A flash I3C master device is configured by a main master during flash discovery/initialization; and contains flash slave device address (RW), which is used to send the flash master cycles.

In turn, flash slave devices represent one or more shared slave storage devices for the various flash masters. Such flash slave devices may contain similar capability or configuration storages, including flash capability registers including MPS register, erase size register and so forth. Such flash slave devices may be implemented with region/address-based access control. A flash sharing slave device may be identified with a capability register bit indicating if the device is a flash slave device that can accept flash access cycles and provide non-volatile storages. The slave device also contains an addressing scheme to discover and route the flash cycles; contains discoverable flash parameters; max packet size; erase size; implements region-based access control, which checks the received flash master cycle's address and region to decide if the access is allowed. Understand while shown at this high level in the embodiment of FIG. 2, many variations and alternatives are possible. That is, FIG. 2 is just one example of a platform; there can be many different configurations supported with this flexible scheme depending on the platform requirements. For example, the flash sharing controller can be implemented on a flash device or EC, etc. The flash sharing bus also can be any multi-master buses, like eSPI or I3C. The shared flash device can be a serial SPI flash or NVMe block storage device also.

Figure 3:
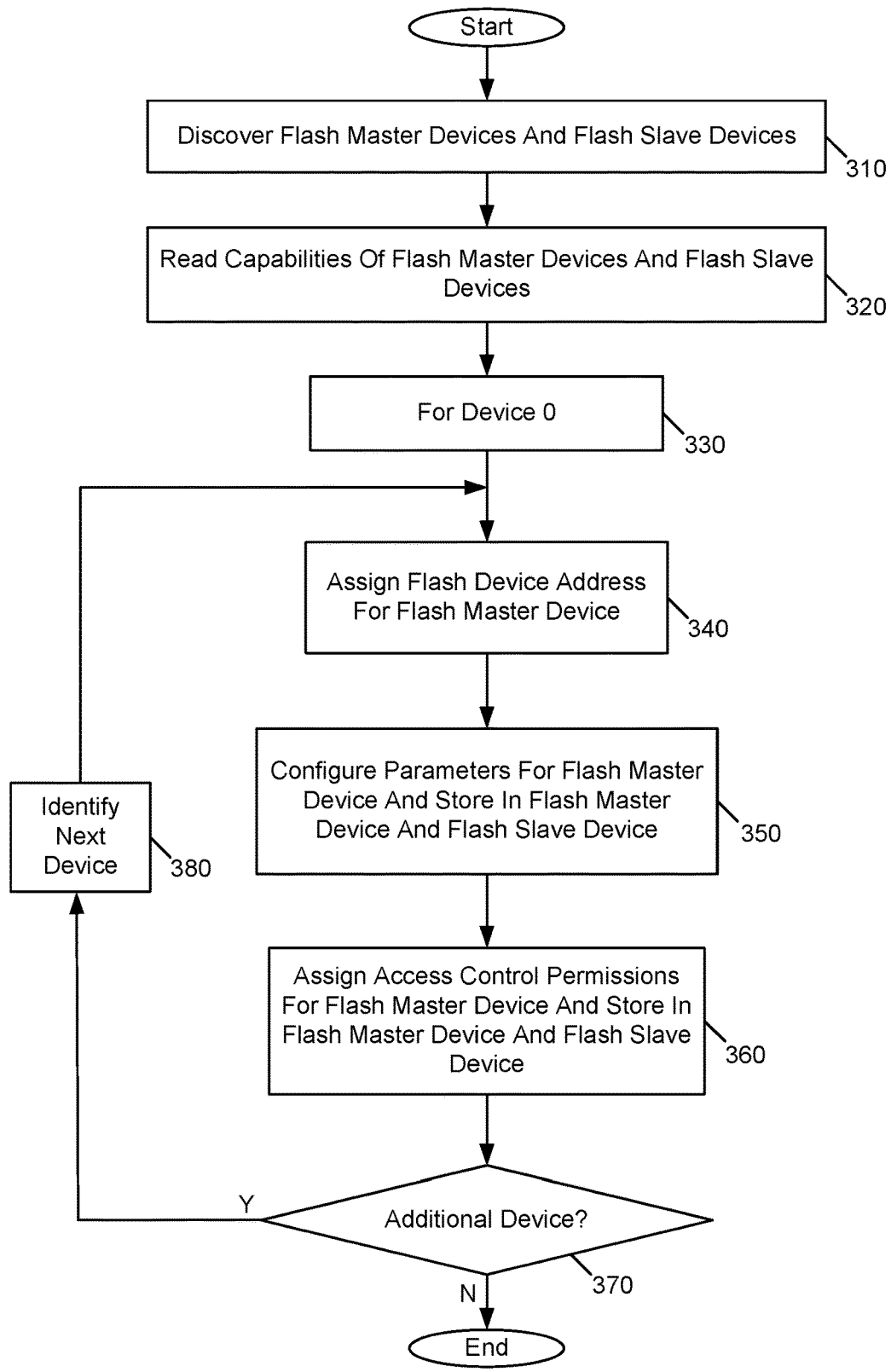
FIG. 3 is a flow diagram of a method in accordance with an embodiment of the present invention.

Referring now to FIG. 3, shown is a flow diagram of a method in accordance with an embodiment of the present invention. As shown in FIG. 3, method 300 is a method for configuring devices for flash sharing in accordance with an embodiment. As such, method 300 may be performed by a flash sharing controller, and as such may be performed by hardware circuitry, firmware, software and/or combinations thereof.

As illustrated in FIG. 3, method 300 begins by discovering flash master devices and flash slave devices (block 310). In an embodiment, this discovery process may be based on a bus communication protocol to perform device discovery of multiple devices coupled to the bus. Next control passes to block 320 where capabilities of the flash master devices and flash slave devices can be read. In an embodiment, the flash master controller may discover the capabilities of all flash sharing devices by way of reading capability registers of these devices.

Based on the capabilities, the flash sharing controller can configure the devices appropriately. Illustrated more specifically in FIG. 3 is one method for configuring such devices. First a given device is identified (block 330). Then at block 340 a flash device address may be assigned for this device (assuming that the device is a flash master device). This flash device address is thus a device address within a flash sharing bus that is assigned to a given master device. Next, control passes to block 350 where parameters for the flash master device may be configured and stored in both the flash master device and the flash slave device. In an embodiment, these configuration parameters may include MPS/erase size information, wait state information and so forth. Next at block 360 access control permissions for the flash master device can be assigned and stored into the flash master device and flash slave device. More specifically, the flash sharing controller may assign a region to each flash master and assign access permissions for such region, e.g., read and write permissions. Next it is determined at diamond 370 whether there is an additional device to be configured. If so, the next device is identified (block 380), and control passes back to block 340 discussed above. Understand while shown at this high level in the embodiment of FIG. 3, many variations and alternatives are possible.

In an embodiment, for a flash read flow, a flash master requests to become the current bus master. After it is granted to be the current master, it issues a flash read (FSC_FLASH_READ) command with the assigned flash slave address; and the flash master issues the flash read cycle as a posted cycle. In a first option (connected), a slave can provide data immediately (wait state needed); if the flash slave detects an access error, e.g., the requesting master does not have read permission to the requested data, the slave will return an unsuccessful completion. After the completion is received, the flash master returns the master role to the main master; and ends. In another option (defer), a slave can defer the read access. When the data is ready, it interrupts the flash master with an in-band interrupt request to become the current bus master. The slave provides a completion cycle with data, FSC_FLASH_CMP_D. If the flash slave detects an access error, e.g., the requesting master does not have read permission to the requested data, the slave returns an unsuccessful completion, FSC_FLASH_CMP_UR.

In an embodiment, for a flash write/erase flow, the flash master requests to become the current bus master; after it is granted current master status, it issues a flash write (FSC_FLASH_WRITE) command. With the assigned flash slave address, it issues the flash write cycle as a posted cycle. The slave normally defers the write access.

When the write completion is ready, it interrupts the flash master with an in-band interrupt request to become the current bus master. The slave provides a completion cycle without data, FSC_FLASH_CMP_ND. If the flash slave detects an access error, e.g., the requesting master does not have write/erase permission to the requested data, the slave will return an unsuccessful completion, FSC_FLASH_CMP_UR. The flash slave returns the master role to the main master, and the write/erase flow ends.

Figure 4:
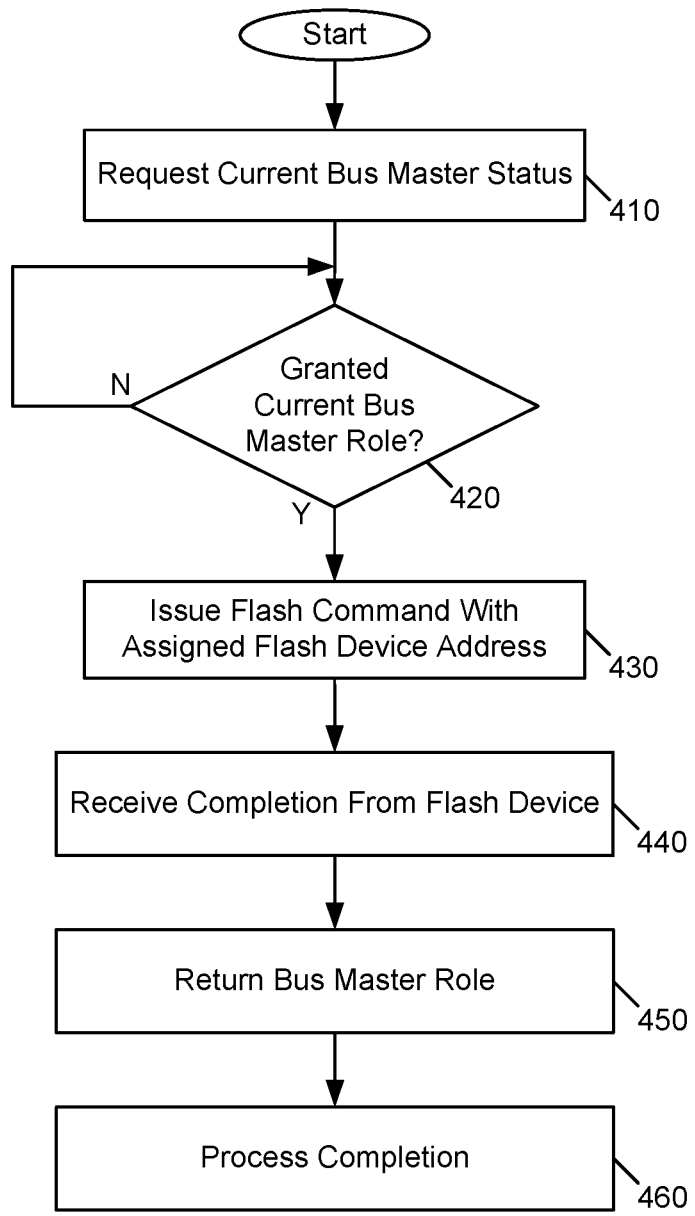
FIG. 4 is a flow diagram of a method in accordance with another embodiment of the present invention.

Referring now to FIG. 4, shown is a flow diagram of a method in accordance with another embodiment of the present invention. As shown in FIG. 4, a method 400 for performing flash accesses to a shared flash memory may be performed by a flash master device having hardware circuitry, firmware, software and/or combinations thereof.

As illustrated, method 400 begins by a given flash master requesting bus master status for the bus (block 410). To this end, the flash master may issue a request to a bus master (e.g., a main master) to seek a bus master role so that it may issue a request. Assuming it is determined at diamond 420 that the flash master device has been granted current bus master role, control passes to block 430 where the flash master may issue a flash command with the assigned flash device address. Such command may be a read command, write command, erase command or so forth. Note that whether a read or write command, the flash master may issue this command as a posted cycle.

Thereafter, the bus master receives a completion from the flash device (block 440). For example for a read access, this completion may include data, while instead for a write access, the completion may indicate a status of the write operation. In any event, control passes to block 450 where the flash master may return the bus master role, e.g., to the main master or another bus master that granted the bus master role to the flash master. Next, control passes to block 460 where the flash master may process the completion. For example in the case of a data return by way of this completion, the flash master may consume the data or provide it to a given destination. In the case of a completion that indicates successful write status, information regarding the write request can be updated, e.g., to indicate the success. In another example, in the case of a failure indicated by way of the completion, the flash master may seek to renew the given access request. Understand while shown at this high level in the embodiment of FIG. 4, many variations and alternatives are possible. Embodiments may be implemented in a wide variety of interconnect structures.

Figure 5:
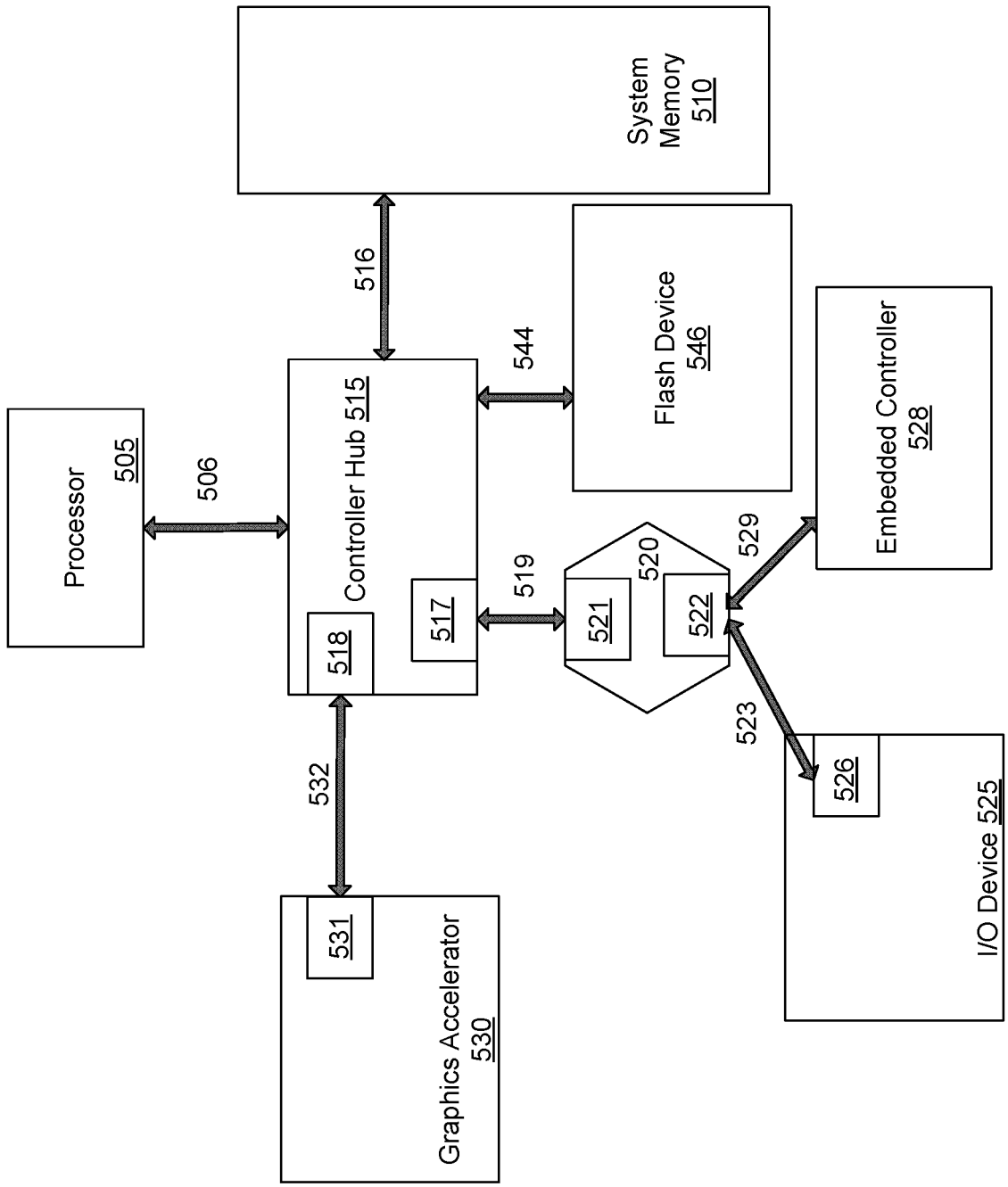
FIG. 5 is an embodiment of a fabric composed of point-to-point links that interconnect a set of components.

Referring to FIG. 5, an embodiment of a fabric composed of point-to-point links that interconnect a set of components is illustrated. System 500 includes processor 505 and system memory 510 coupled to a controller hub 515. Processor 505 includes any processing element, such as a microprocessor, a host processor, an embedded processor, a co-processor, or other processor. Processor 505 is coupled to controller hub 515 through front-side bus (FSB) 506. In one embodiment, FSB 506 is a serial point-to-point interconnect. In an embodiment, where processor 505 and controller hub 515 are implemented on a common semiconductor die, bus 506 may be implemented as an on-die interconnect. In yet another implementation where processor 505 and controller hub 515 are implemented as separate die within a multi-chip package, bus 506 can be implemented as an intra-die interconnect.

System memory 510 includes any memory device, such as random access memory (RAM), non-volatile (NV) memory, or other memory accessible by devices in system 500. System memory 510 is coupled to controller hub 515 through memory interface 516. Examples of a memory interface include a double-data rate (DDR) memory interface, a dual-channel DDR memory interface, and a dynamic RAM (DRAM) memory interface.

In one embodiment, controller hub 515 is a root hub, root complex, or root controller in a PCIe interconnection hierarchy. Examples of controller hub 515 include a chip set, a peripheral controller hub (PCH), a memory controller hub (MCH), a northbridge, an interconnect controller hub (ICH), a southbridge, and a root controller/hub. Often the term chipset refers to two physically separate controller hubs, i.e. a memory controller hub (MCH) coupled to an interconnect controller hub (ICH). Note that current systems often include the MCH integrated with processor 505, while controller 515 is to communicate with I/O devices, in a similar manner as described below. In some embodiments, peer-to-peer routing is optionally supported through root complex 515.

Here, controller hub 515 is coupled to switch/bridge 520 through serial link 519. Input/output modules 517 and 521, which may also be referred to as interfaces/ports 517 and 521, include/implement a layered protocol stack to provide communication between controller hub 515 and switch 520. In one embodiment, multiple devices are capable of being coupled to switch 520.

Switch/bridge 520 routes packets/messages from device 525 upstream, i.e., up a hierarchy towards a root complex, to controller hub 515 and downstream, i.e., down a hierarchy away from a root controller, from processor 505 or system memory 510 to device 525. Switch 520, in one embodiment, is referred to as a logical assembly of multiple virtual PCI-to-PCI bridge devices. Device 525 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices and which may be coupled via an I3C bus, as an example. Often in the PCIe vernacular, such a device is referred to as an endpoint. Although not specifically shown, device 525 may include a PCIe to PCI/PCI-X bridge to support legacy or other version PCI devices. Endpoint devices in PCIe are often classified as legacy, PCIe, or root complex integrated endpoints.

As further illustrated in FIG. 5, another device that may couple to switch/bridge 520 is an embedded controller 528, which as described herein may be one of multiple devices that share access to a flash device 546, which is coupled to controller hub 515 via an interconnect 544, which in an embodiment may be a SPI interconnect.

Graphics accelerator 530 is also coupled to controller hub 515 through serial link 532. In one embodiment, graphics accelerator 530 is coupled to an MCH, which is coupled to an ICH. Switch 520, and accordingly I/O device 525, is then coupled to the ICH. I/O modules 531 and 518 are also to implement a layered protocol stack to communicate between graphics accelerator 530 and controller hub 515. A graphics controller or the graphics accelerator 530 itself may be integrated in processor 505.

Figure 6:
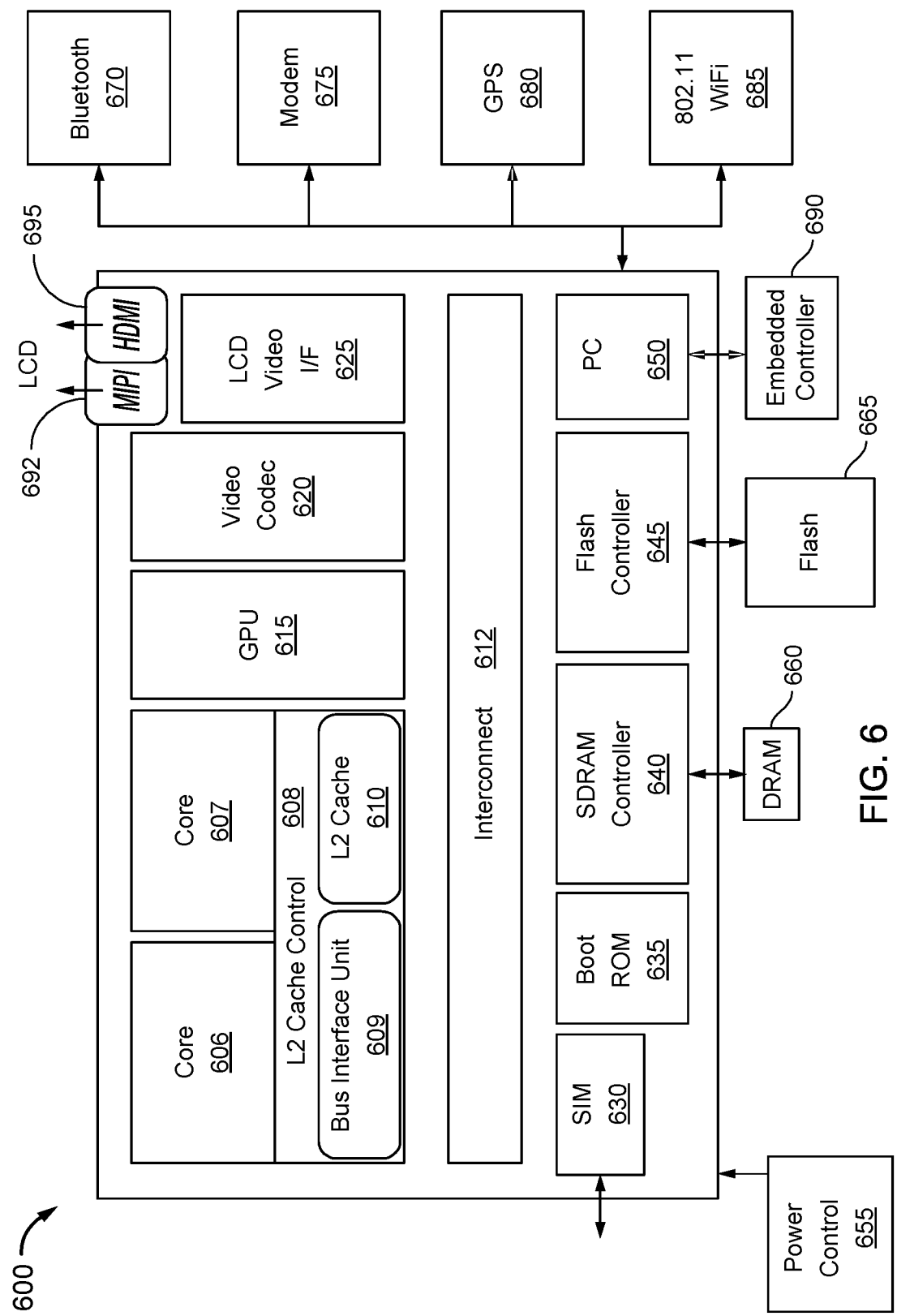
FIG. 6 is an embodiment of a system-on-chip design in accordance with an embodiment.

Turning next to FIG. 6, an embodiment of a SoC design in accordance with an embodiment is depicted. As a specific illustrative example, SoC 600 may be configured for insertion in any type of computing device, ranging from portable device to server system. Here, SoC 600 includes 2 cores 606 and 607. Cores 606 and 607 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 606 and 607 are coupled to cache control 608 that is associated with bus interface unit 609 and L2 cache 610 to communicate with other parts of system 600 via an interconnect 612.

Interconnect 612 provides communication channels to the other components, such as a Subscriber Identity Module (SIM) 630 to interface with a SIM card, a boot ROM 635 to hold boot code for execution by cores 606 and 607 to initialize and boot SoC 600, a SDRAM controller 640 to interface with external memory (e.g., DRAM 660), a flash controller 645 to interface with non-volatile memory (e.g., flash memory 665 that may be shared by multiple devices coupled to a serial bus), a peripheral controller 650 (e.g., via an eSPI interface) to interface with peripherals, such as an embedded controller 690. As described herein, with an implementation, embedded controller 690 may be one of multiple integrated circuits that share access to flash memory 665.

Still referring to FIG. 6, system 600 further includes video codec 620 and video interface 625 to display and receive input (e.g., touch enabled input), GPU 615 to perform graphics related computations, etc. In addition, the system illustrates peripherals for communication, such as a Bluetooth module 670, 3G modem 675, GPS 680, and WiFi 685. Also included in the system is a power controller 655. Further illustrated in FIG. 6, system 600 may additionally include interfaces including a MIPI interface 692, e.g., to a display, and/or an HDMI interface 695 also which may couple to the same or a different display, and one or more USB Type-C interfaces. Note that these interfaces may include or be associated with port retimers and/or PD controllers, and which may share flash memory 665 for storage of firmware, configuration information and so forth, as described herein.

Figure 7:
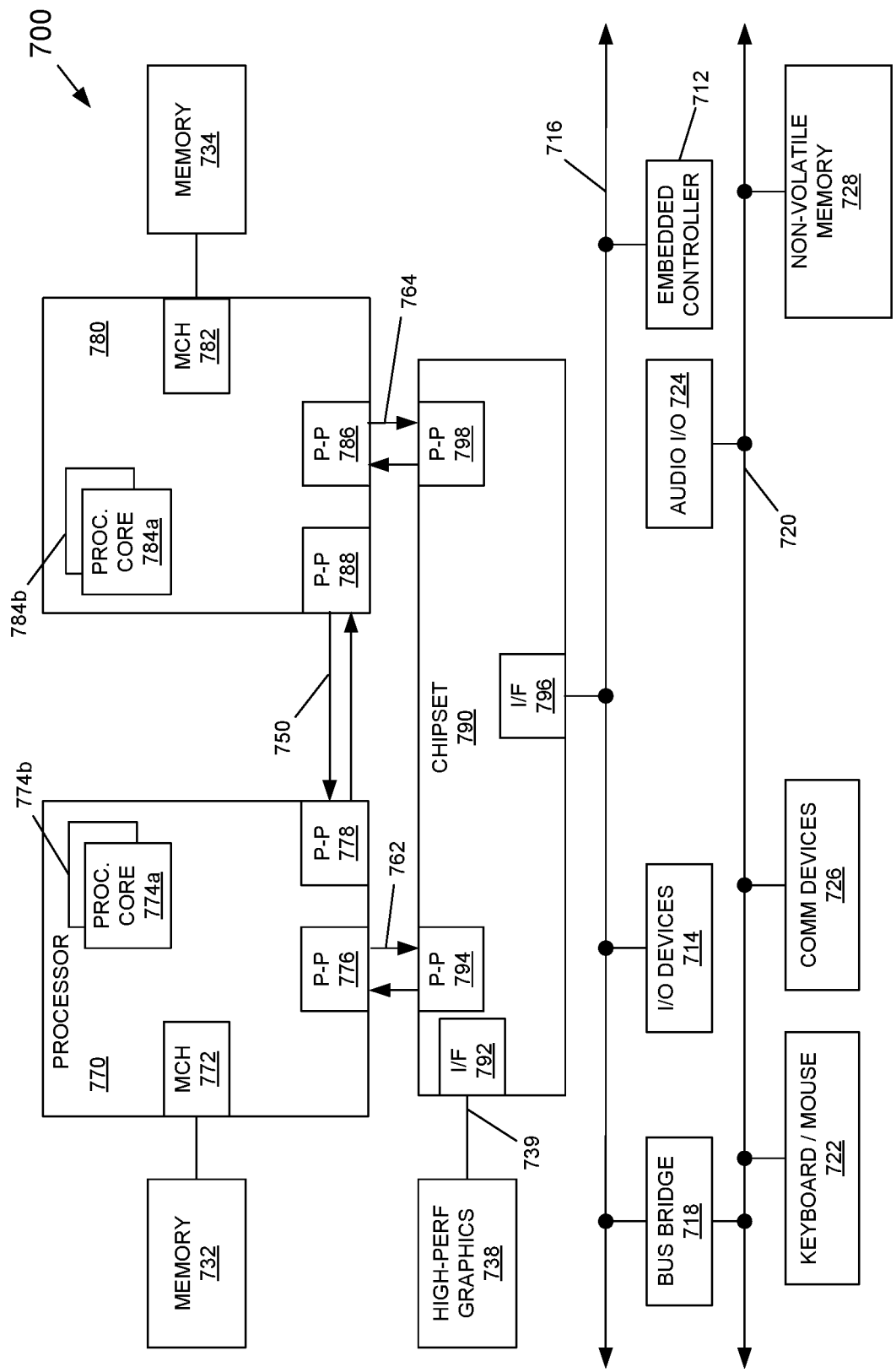
FIG. 7 is a block diagram of a system in accordance with an embodiment of the present invention.

Referring now to FIG. 7, shown is a block diagram of a system in accordance with an embodiment of the present invention. As shown in FIG. 7, multiprocessor system 700 includes a first processor 770 and a second processor 780 coupled via a point-to-point interconnect 750. As shown in FIG. 7, each of processors 770 and 780 may be many core processors including representative first and second processor cores (i.e., processor cores 774a and 774b and processor cores 784a and 784b).

Still referring to FIG. 7, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 7, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 762 and 764, respectively. As shown in FIG. 7, chipset 790 includes P-P interfaces 794 and 798.

Furthermore, chipset 790 includes an interface 792 to couple chipset 790 with a high performance graphics engine 738, by a P-P interconnect 739. As shown in FIG. 7, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a non-volatile memory 728 such as a given non-volatile memory, e.g., a shared flash memory as described herein. To this end, an embedded controller 712 may be one of multiple devices seeking bus master status to realize shared flash access as described herein. Further, an audio I/O 724 may be coupled to second bus 720.

The following examples pertain to further embodiments.

In one example, an apparatus comprises a flash sharing controller to enable a plurality of components of a platform to share a flash memory. The flash sharing controller in turn comprises: a flash sharing class layer including a configuration controller to configure the plurality of components to be flash master devices and configure a flash sharing slave device for the flash memory; and a physical layer coupled to the flash sharing class layer, the physical layer to communicate with the plurality of components via a bus.

In an example, the physical layer is to communicate with the flash memory via a second bus.

In an example, the flash sharing controller further comprises a discovery controller to discover the plurality of components and determine capability information of the plurality of components.

In an example, the configuration controller is to configure each of the plurality of components with a maximum payload size and a region of the flash memory.

In an example, a first subset of the plurality of components comprise port retimers.

In an example, the apparatus comprises a peripheral controller hub comprising the flash sharing controller and at least one of the plurality of components.

In an example, a first component of the plurality of components is to: request a bus master role from a bus master for the bus; in response to a grant of the bus master role, issue a flash command to the flash memory; and after receipt of a completion from the flash memory, return the bus master role to the bus master.

In an example, the first component is to receive, in the completion, one or more of firmware and configuration information from the flash memory.

In an example, the first component comprises a flash sharing class layer including a master requester to request the bus master role from the bus master.

In an example, the flash sharing class layer of the first component is coupled between an application layer of the first component and a physical layer of the first component.

In an example, the flash sharing controller further comprises an access permission manager to manage access permissions to the flash memory by the plurality of components.

In an example, the flash memory comprises a single flash memory of the platform, and at least some of the plurality of components comprise integrated circuits coupled to the flash sharing controller via the bus.

In another example, a method comprises: requesting, by a first device of a platform, a bus master role for a bus having a plurality of devices coupled thereto, from a bus master for the bus; in response to receiving the bus master role in the first device, issuing a flash command to a flash memory, the flash memory shared by the plurality of devices; and receiving, in the first device, a completion from the flash memory and after receiving the completion, returning the bus master role to the bus master.

In an example, the method further comprises issuing the flash command with an address of the flash memory, the address stored in an address storage of the first device in response to configuration of the first device by a flash sharing controller.

In an example, the method further comprises: discovering, via a flash sharing controller, the plurality of components and determining capability information of the plurality of components; and configuring, via the flash sharing controller, each of the plurality of components with a maximum payload size and a region of the flash memory.

In an example, the method further comprises receiving at least one of firmware and configuration information for the first device in the completion.

In an example, the method further comprises: requesting, by a second device of the platform, the bus master role for the bus, from the bus master; in response to receiving the bus master role in the second device, issuing a second flash command to the flash memory; receiving, in the second device, a completion from the flash memory, the completion comprising firmware for the second device; and executing the firmware in the second device.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a system comprises: a plurality of integrated circuits, each of the plurality of integrated circuits to execute a corresponding firmware stored in a flash memory; the flash memory coupled to the plurality of integrated circuits via a serial bus, the flash memory to store the corresponding firmware for the plurality of integrated circuits; and a flash sharing controller coupled to the serial bus. The flash sharing controller comprises: a flash sharing class layer including a configuration controller to configure the plurality of integrated circuits to be flash master devices and configure a flash sharing slave device for the flash memory; and a physical layer coupled to the flash sharing class layer, the physical layer to communicate with the plurality of integrated circuits via the serial bus.

In an example, the flash sharing controller comprises a discovery controller to discover the plurality of integrated circuits and determine capability information of the plurality of integrated circuits.

In an example, a first integrated circuit of the plurality of integrated circuits comprises a flash sharing class layer including a requester to request master status for the bus, and in response to receipt of the master status, the first integrated circuit is to issue a flash read command to the flash memory to read a first firmware for the integrated circuit, store the first firmware in the first integrated circuit, release the bus master status, and execute the first firmware.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a flash sharing controller to enable a plurality of components of a platform to share a flash memory, the flash memory to store, for each of the plurality of components, at least some of a firmware for the component, parameter information for the component, and configuration information for the component, the flash sharing controller comprising:
a flash sharing class layer including a configuration controller to configure the plurality of components to be flash master devices and configure a flash sharing slave device for the flash memory; and
a physical layer coupled to the flash sharing class layer, the physical layer to communicate with the plurality of components via a bus.

2. The apparatus of claim 1, wherein the physical layer is to communicate with the flash memory via a second bus.

3. The apparatus of claim 1, wherein the flash sharing controller further comprises a discovery controller to discover the plurality of components and determine capability information of the plurality of components.

4. The apparatus of claim 1, wherein the configuration controller is to configure each of the plurality of components with a maximum payload size and a region of the flash memory that the component is authorized to access, wherein the component is not authorized to access other regions of the flash memory.

5. The apparatus of claim 1, wherein a first subset of the plurality of components comprise port retimers.

6. The apparatus of claim 1, wherein the apparatus comprises a peripheral controller hub to couple to a processor via a third bus and to couple to the flash memory via the second bus, the peripheral controller hub comprising the flash sharing controller and at least one of the plurality of components.

7. The apparatus of claim 1, wherein a first component of the plurality of components is to:
request a bus master role from a bus master for the bus;
in response to a grant of the bus master role, issue a flash command to the flash memory; and
after receipt of a completion from the flash memory, return the bus master role to the bus master.

8. The apparatus of claim 7, wherein the first component is to receive, in the completion, one or more of the firmware and the configuration information from the flash memory.

9. The apparatus of claim 8, wherein the first component comprises a flash sharing class layer including a master requester to request the bus master role from the bus master.

10. The apparatus of claim 9, wherein the flash sharing class layer of the first component is coupled between an application layer of the first component and a physical layer of the first component.

11. The apparatus of claim 1, wherein the flash sharing controller further comprises an access permission manager to manage access permissions comprising read permission and write permission to the flash memory by the plurality of components.

12. The apparatus of claim 1, wherein the flash memory comprises a single flash memory of the platform, and at least some of the plurality of components comprise integrated circuits coupled to the flash sharing controller via the bus.

13. A system comprising:
a plurality of integrated circuits, each of the plurality of integrated circuits to execute a corresponding different firmware stored in a flash memory;
the flash memory coupled to the plurality of integrated circuits via a serial bus, the flash memory to store the corresponding different firmware for the plurality of integrated circuits, and to further store corresponding different parameter information for the plurality of integrated circuits and corresponding different configuration information for the plurality of integrated circuits; and a flash sharing controller coupled to the serial bus, the flash sharing controller comprising:
  a flash sharing class layer including a configuration controller to configure the plurality of integrated circuits to be flash master devices and configure a flash sharing slave device for the flash memory; and
  a physical layer coupled to the flash sharing class layer, the physical layer to communicate with the plurality of integrated circuits via the serial bus.

14. The system of claim 13, wherein the flash sharing controller comprises a discovery controller to discover the plurality of integrated circuits and determine capability information of the plurality of integrated circuits.

15. The system of claim 13, wherein a first integrated circuit of the plurality of integrated circuits comprises a flash sharing class layer including a requester to request master status for the bus, and in response to receipt of the master status, the first integrated circuit is to issue a flash read command to the flash memory to read a first firmware for the integrated circuit, store the first firmware in the first integrated circuit, release the bus master status, and execute the first firmware.

16. The apparatus of claim 1, wherein the flash sharing controller further comprises an access permission manager to permit a first component to access a first region of the flash memory and prevent the first component from access to other portions of the flash memory.

17. The apparatus of claim 6, wherein the bus comprises a high definition multimedia interface (HDMI) bus, the second bus comprises a serial bus, and the third bus comprises a direct media interface bus.

18. The apparatus of claim 6, further comprising a second flash master device to couple to the processor and the PCH, the second flash master device comprising an interface for a second plurality of components.

19. The apparatus of claim 18, wherein the plurality of components comprises a first set of port retimers and the second plurality of components comprises a second set of port retimers.

* * * * *